United States Patent [19]
McCrory

[11] Patent Number: 5,875,994
[45] Date of Patent: Mar. 2, 1999

[54] LANDING GEAR OPERATOR

[76] Inventor: Leonard McCrory, 20864 E. 2000th Ave., Yale, Ill. 62481

[21] Appl. No.: 22,040

[22] Filed: Feb. 11, 1998

[51] Int. Cl.$^6$ .................................................. B64C 25/20
[52] U.S. Cl. ................................... 244/102 A; 244/102 R
[58] Field of Search ........................... 244/102 R, 102 A, 244/102 SL

[56] References Cited

U.S. PATENT DOCUMENTS

| | | | |
|---|---|---|---|
| 1,812,211 | 6/1931 | McCrea | 244/102 R |
| 1,958,486 | 5/1934 | Medvedeff . | |
| 2,021,439 | 11/1935 | Wells | 244/102 R |
| 2,030,293 | 2/1936 | Haberlin | 244/102 R |
| 2,112,253 | 3/1938 | Smith | 244/102 R |
| 2,185,235 | 1/1940 | Swanson | 244/102 R |
| 2,262,330 | 11/1941 | MacNeil et al. | 244/102 R X |
| 2,366,764 | 1/1945 | Lear | 244/102 R |
| 2,383,901 | 8/1945 | Werner | 244/102 R X |
| 2,387,713 | 10/1945 | Bradford | 244/102 R X |
| 2,444,319 | 6/1948 | Winter | 244/102 SL |
| 2,446,415 | 8/1948 | Flurscheim et al. . | |
| 2,460,506 | 2/1949 | Jamison . | |
| 2,473,362 | 6/1949 | Cook | 244/102 R |
| 2,667,953 | 2/1954 | Griswold | 244/102 R X |
| 2,740,135 | 4/1956 | Church . | |
| 3,132,829 | 5/1964 | Bochman, Jr. | 244/102 R |

FOREIGN PATENT DOCUMENTS

| | | | |
|---|---|---|---|
| 329850 | 9/1935 | Italy | 244/102 R |
| 338502 | 3/1936 | Italy | 244/102 R |
| 527281 | 10/1940 | United Kingdom | 244/102 R |

*Primary Examiner*—William Grant
*Attorney, Agent, or Firm*—Terrance L. Siemens

[57] ABSTRACT

An operator for lowering and retracting two or more landing gear on an aircraft with a single motor. The output of the motor is modified by a reduction gear assembly, then rotates a drive shaft of each drive, there being one drive for each landing gear assembly. Output of each drive shaft turns a universal joint, then a screw shaft fixed to the universal joint. The screw shaft is arranged to turn in a threaded collar fixed to a tubular stabilizing strut connected to the main strut of the landing gear such that rotation telescopically extends and contracts the paired strut and screw shaft when the latter rotates. Two opposing landing gear are driven by mirror image drives of the operator. Optionally, a third drive shaft and screw shaft lower and retract the nose wheel or tail wheel of the aircraft.

6 Claims, 6 Drawing Sheets

LANDING GEAR OPERATOR

BACKGROUND OF THE INVENTION

1. Field of the Invention

The present invention relates to apparatus for lowering and retracting landing gear for aircraft. A single motor operates plural drives each retracting and lowering one or more wheels, so that all wheels are lowered and retracted simultaneously.

2. Description of the Prior Art

Landing gear for current aircraft designs provides for taking off and landing with the landing gear in the deployed position and for flight with the landing gear retracted, except for a limited number of small aircraft having landing gear fixed in the deployed position. The landing gear generally includes a vertical support strut and an inclined stabilizing strut for each wheel assembly, wherein the vertical and inclined orientations are defined when the landing gear is in the deployed condition. Both struts are pivotally mounted to the aircraft.

Some prior art arrangements allow for simultaneous lowering and retraction of landing gear. Examples are seen in U.S. Pat. No. 1,958,486, issued to Nicholas J. Medvedeff on May 15, 1934, U.S. Pat. No. 2,262,330, issued to Charles I. MacNeil et al. on Nov. 11, 1941, and U.S. Pat. No. 2,446,415, issued to Cedric H. Flurscheim et al. on Aug. 3, 1948, and U.K. Patent Number 527,281, dated Oct. 4, 1940. MacNeil et al. employs a screw shaft drive which acts on an inclined strut to urge a wheel into deployed and retracted positions. However, MacNeil et al. lacks a universal joint arranged to maintain a section of the screw shaft parallel to the inclined strut, as seen in the present invention. MacNeil et al. must anchor both ends of the screw shaft in addition to providing a threaded collar which travels along the screw shaft. In the present invention, the threaded collar assists in securing or anchoring the screw shaft. Operation of MacNeil et al. is opposite that of the present invention. MacNeil et al. pushes the wheel away when retracting, whereas the present invention pulls the wheel into the retracted position.

Medvedeff also employs a screw shaft drive, but supports the weight of the aircraft on the screw shaft. This is avoided in the present invention. Instead, the inclined strut in the present invention is acted on by the screw shaft drive.

The device of Flurscheim et al. retracts the wheel in arcuate motion sweeping through fore and aft along the fuselage in a vertical plane. By contrast, the wheel in the present invention sweeps through a torroidal path having an axis parallel with the longitudinal axis of the aircraft.

In the U.K. patent, wheels are moved by gears. By contrast, the present invention employs a screw shaft drive. There is no possibility of providing a screw shaft which remains parallel to an inclined strut acting on the principal, weight bearing strut supporting the wheel.

In U.S. Pat. No. 2,446,528, issued to Edgar A. Clark on Aug. 10, 1948, a screw shaft drive retracts the wheels. However, the screw shaft is fixed relative to the fuselage, whereas in the present invention, a universal joint arrangement enables the screw shaft to remain parallel to an inclined stabilizing strut as the strut changes its orientation relative to a horizontal direction.

A wheel deployment and retraction scheme seen in U.S. Pat. No. 2,740,135, issued to Charles P. Church on Apr. 3, 1956, features a toothed rack drive. However, when retracting, the wheel moves in a vertical plane in a manner similar to Flurscheim et al. In the present invention, the wheel sweeps through a toroidal path having an axis parallel to the longitudinal axis of the aircraft.

A retraction scheme shown in U.S. Pat. No. 2,185,235, issued to Oscar A. Swanson on Jan. 2, 1940, causes the weight of the aircraft to be imposed on the screw shaft in a manner similar to Medvedeff. This is avoided in the present invention.

None of the above inventions and patents, taken either singly or in combination, is seen to describe the instant invention as claimed.

SUMMARY OF THE INVENTION

The present invention provides a transmission capable of simultaneously lowering and retracting two or more wheels of an aircraft. The transmission utilizes a screw shaft drive in a manner such that the weight of the aircraft is borne securely on principal structural struts each supporting one of the several wheels of the aircraft. This strut is pivotally fixed to a structurally strong portion of the aircraft.

Retraction and lowering are accomplished by respectively pulling up and pushing away a rigid inclined, two part telescoping stabilizing strut which is fixed at one end to the fuselage and at the other end to the principal weight bearing structural strut supporting a wheel. The screw shaft comprises one of the two telescoping parts, and a cooperating tube surrounding the screw shaft comprises the other telescoping part.

The screw shaft is rotated from a single motor from a drive shaft extending transversely along the fuselage to serve each of two principal wheels. The motor is reversibly controlled. A suitable reduction gear is provided to balance rotational speed and torque characteristics of the motor with those of the drive. In a preferred embodiment of the invention, the drive shaft has a gear engaging a corresponding gear of a supplementary drive shaft. The supplementary drive shaft conducts power to a third wheel, such as a nose wheel or tail wheel, which may be lowered and retracted in a manner similar to that of the principal wheels.

Telescoping action of the stabilizing strut minimizes exposure of screw threads to dirt and other contaminants. The arrangement of telescoping stabilizing strut eliminates need for providing two points of anchorage of the screw shaft in addition to a threaded collar enabling a rigid shaft to be moved when the screw shaft is rotated.

Accordingly, it is one object of the invention to provide a transmission capable of raising and lowering plural landing gear of an aircraft simultaneously from a single motor.

It is another object of the invention to provide a telescoping stabilizing strut disposed in an inclined relation to a vertical strut supporting each wheel.

It is a further object of the invention to utilize a screw shaft drive to raise and lower landing gear.

Still another object of the invention is to minimize exposure of the screw shaft to dirt and contaminants.

An additional object of the invention is to enable convenient connection of the novel landing gear operator to a third wheel.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
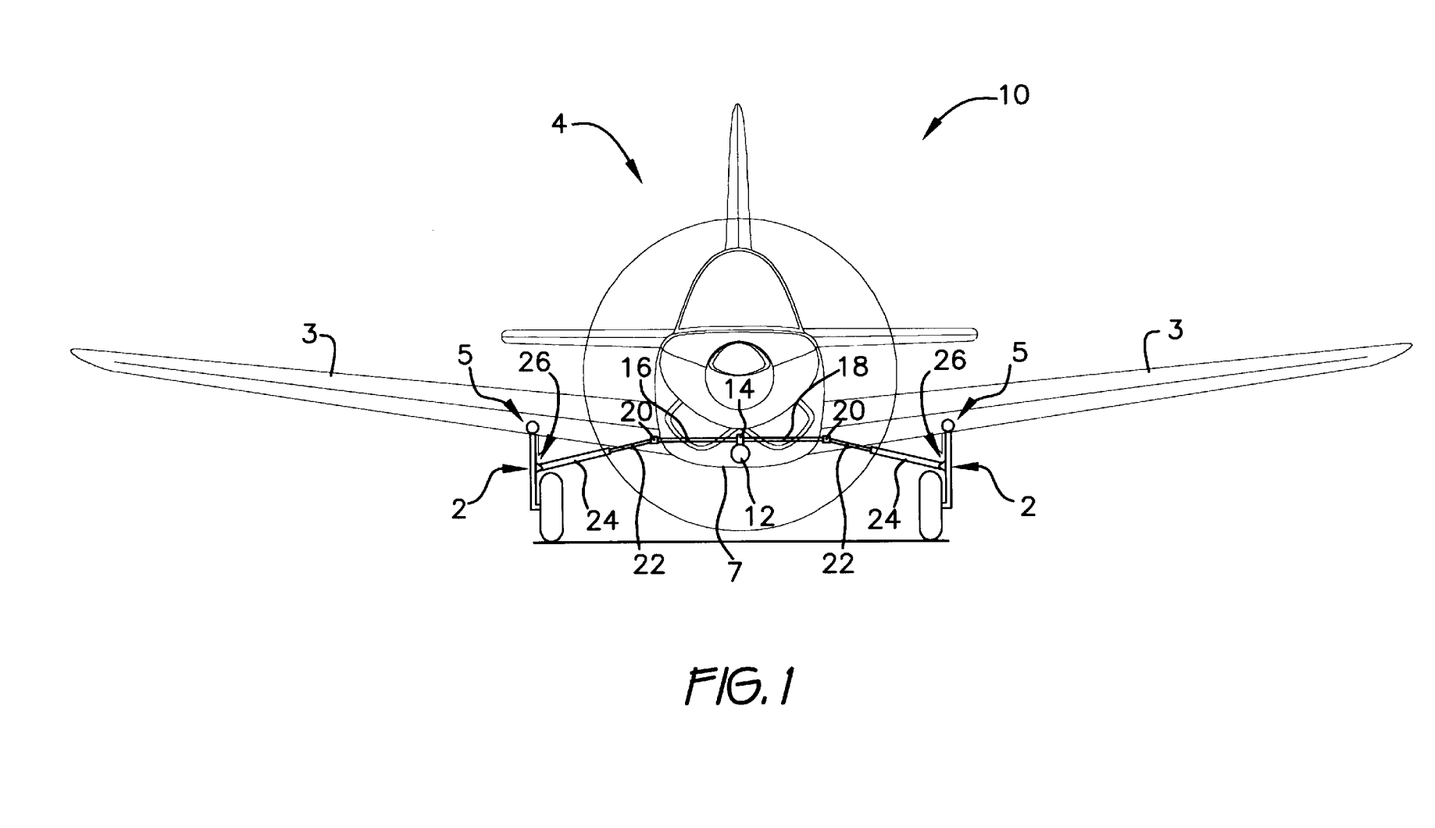
FIG. 1 is an environmental, front diagrammatic view of the invention, showing landing gear in a deployed condition.

Turning now to FIG. 1 of the drawings, the novel operator 10 for lowering landing gear 2 of an aircraft 4 into a deployed condition and retracting landing gear 2 for stowage is shown in the deployed condition wherein landing gear assemblies 2 are lowered to support aircraft 4 on the ground. Landing gear assemblies 2 are generally conventional, having a principal, weight supporting strut 6 and wheel 8. The inventive principles would be equally applicable in those cases wherein each landing gear assembly 2 included two wheels, although this is not shown. Strut 6 is pivotally mounted to the wing 3 of aircraft 4 at a clevis, pillow block bearing, or other suitable journalling arrangement 5.

Operator 10 is seen to comprise a motor 12, a gear reduction assembly 14, and a drive shaft having two sections 16, 18, all housed within the fuselage 7 of aircraft 4. Of course, the drive shaft could comprise a single shaft passing through gear reduction assembly 14 or could comprise two separate sections. Motor 12 is reversible, the reversing function being accomplished in well known fashion by a switch (not shown) which reconnects power appropriately to effect forward and reverse motor rotation. One direction lowers landing gear assemblies 2 and the opposite direction retracts or raises assemblies 2.

Each drive shaft section 16 or 18 terminates in a universal joint 20. A rigid screw shaft 22 is fixed to universal joint 20 at one end, and to a rigid, tubular stabilizing strut 24 at the other end. Shaft 22 is thus flexibly secured to drive shaft section 16 or 18, in that shaft 22 will rotate responsive to shaft section 16 or 18 rotating, even though shaft 22 may be oriented other than coaxially with drive shaft section 16 or 18. Each strut 24 is connected to a clevis 26 fixed to principal strut 2 of aircraft 4.

Each universal joint 20, screw shaft 22, tubular strut 24, and clevis 26 forms a drive for raising and lowering one landing gear 2. There are two drives provided and driven by motor 12 in FIG. 1, each drive essentially being a mirror image of the other. Screw thread pitches are arranged so that when drive shaft sections 16 and 18 rotate in a similar direction, both drives retract their respective landing gear assemblies 2 or lower the same.

Figure 2:
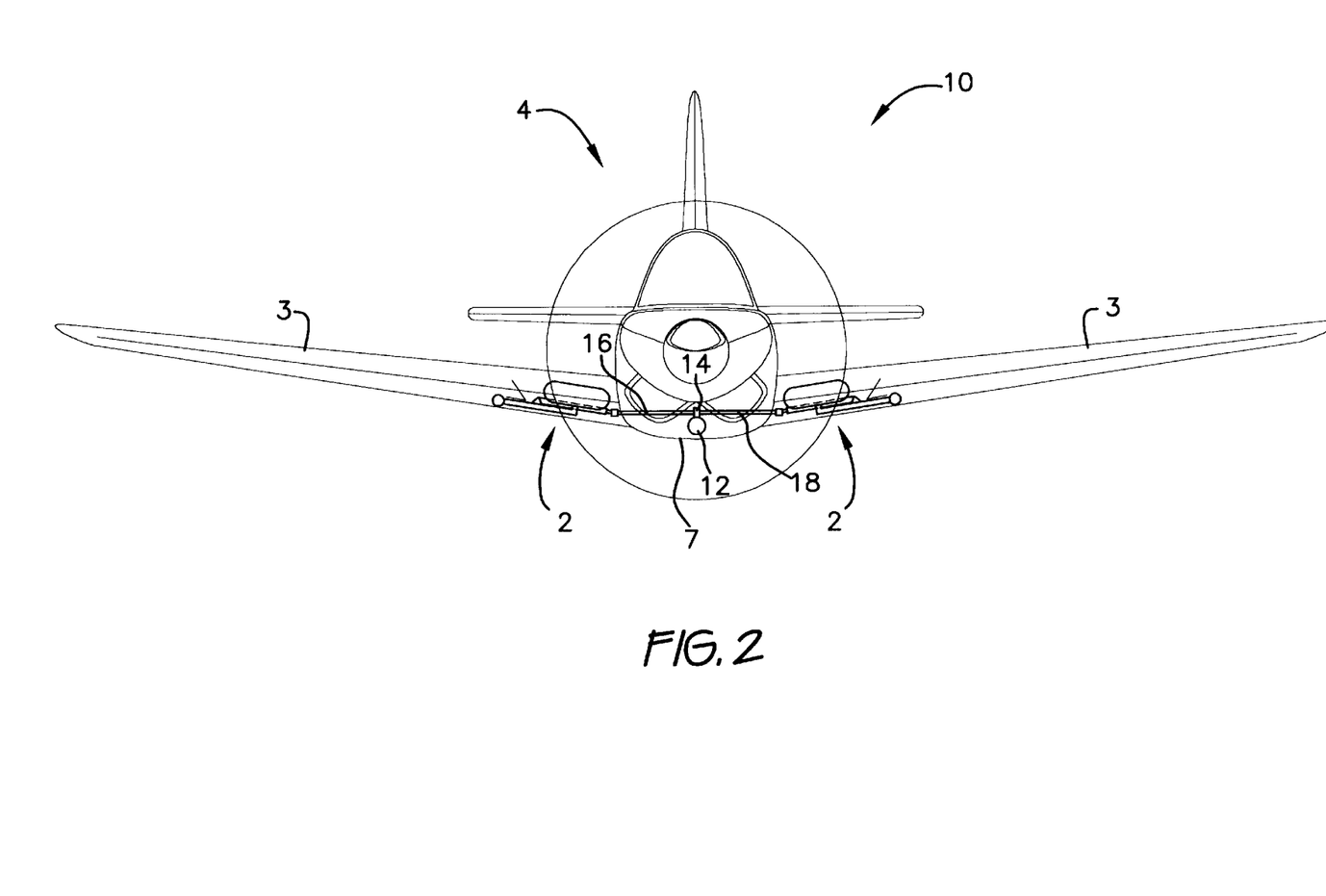
FIG. 2 is an environmental, front diagrammatic view of the invention, showing landing gear retracted.

FIG. 2 shows aircraft 4 after retraction of landing gear assemblies 2. As seen by comparing FIGS. 1 and 2, retraction and deployment of landing gear assemblies 2 causes wheels 8 (see FIG. 3) to move laterally (between the center of the fuselage to the right and left extremities thereof) and arcuately (about pivot points established at journalling arrangement 5). Preferably, each entire landing gear assembly 2 and components of its drive are fully received within a wing 3.

Figure 3:
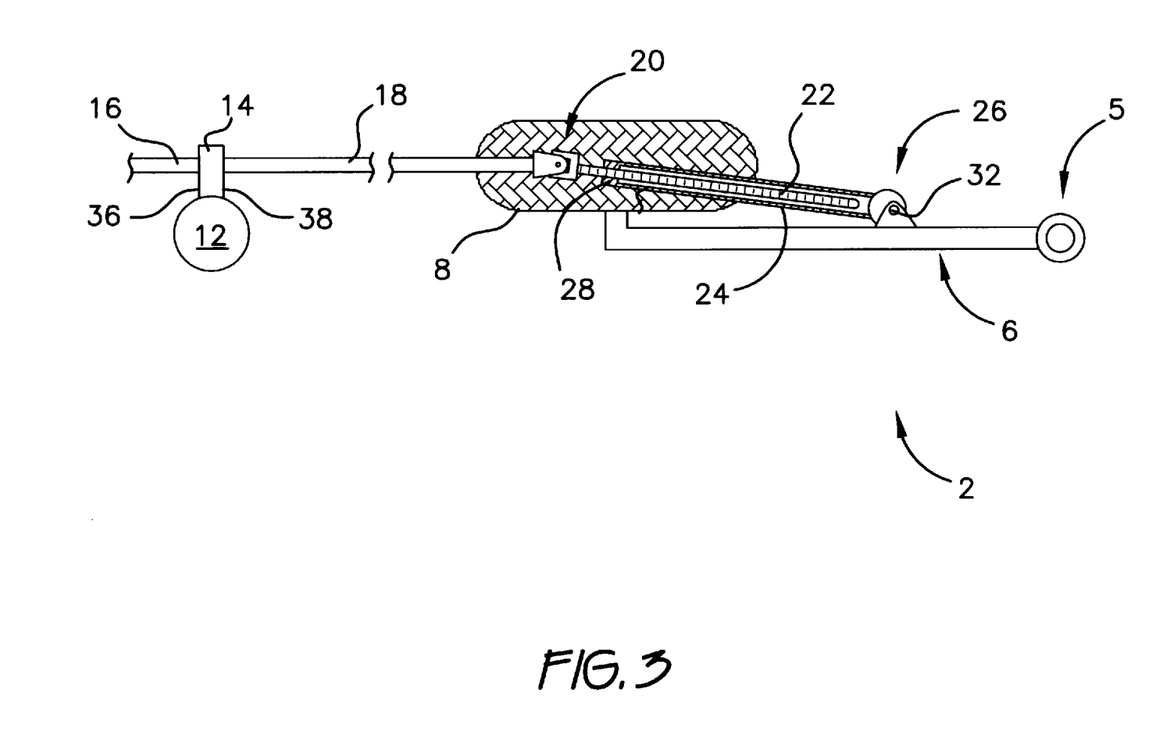
FIG. 3 is a front diagrammatic detail view of the invention similar to FIG. 2, drawn partly in cross section and to larger scale.
Figure 4:
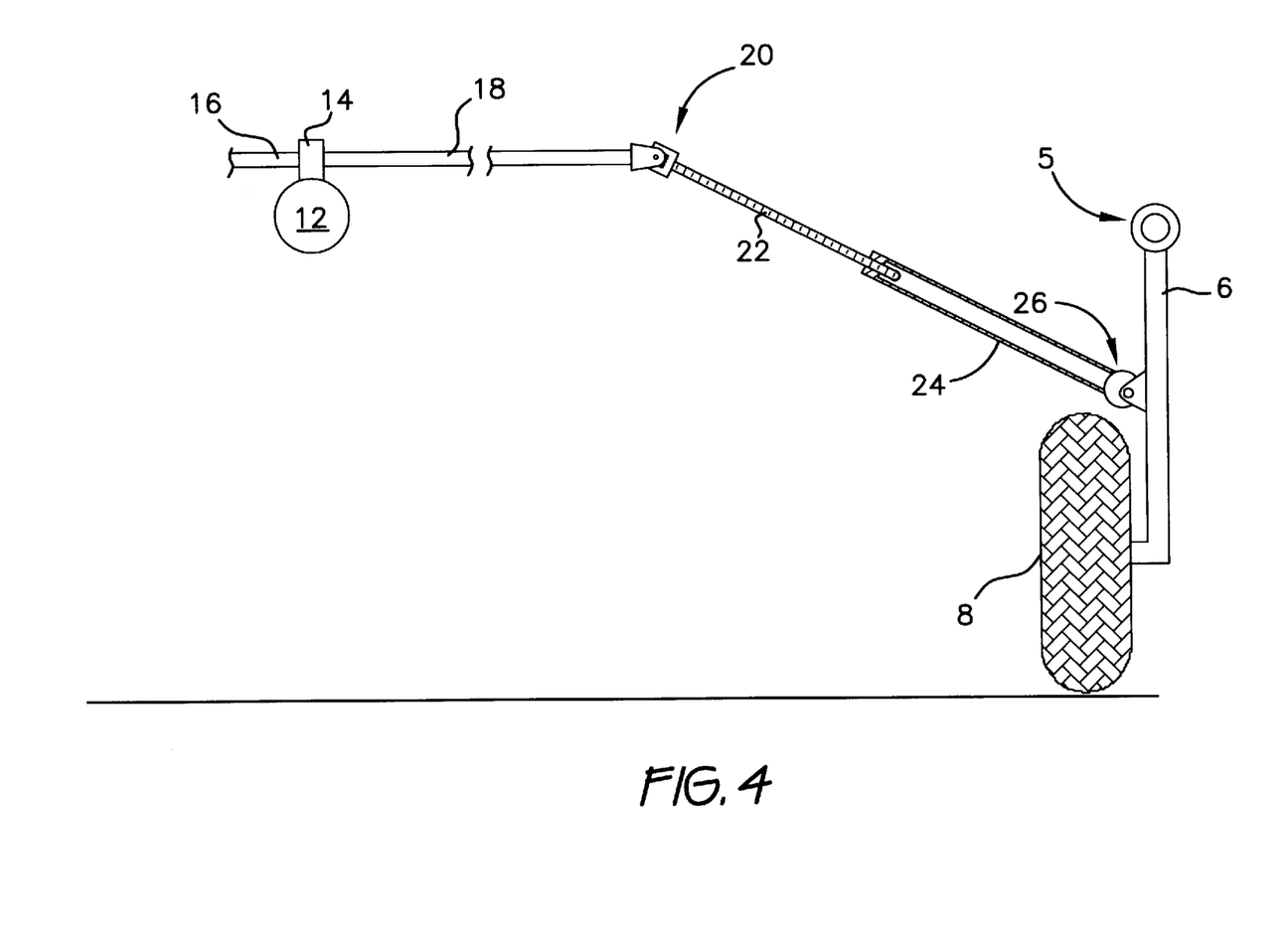
FIG. 4 is a front diagrammatic detail view of the invention similar to FIG. 1, drawn partly in cross section and to larger scale.

The nature of the drives is clearly shown in FIGS. 3 and 4. FIG. 3 corresponds to FIG. 2, wherein landing gear assemblies are retracted. Recalling that each drive is essentially a mirror image of the other, one drive will be described. Tubular strut 24 is seen to have a threaded collar 28 which cooperatingly receives threads of screw shaft 22. When screw shaft 22 is rotated by operation of motor 12, strut 24, which is constrained against similar rotation by the nature of clevis 26, is drawn in the direction of universal joint 20 in one direction of rotation of shaft 22, and is pushed away by the opposite direction of rotation. Starting from the position of landing gear assemblies 2 shown in FIG. 1, drawing strut 24 towards universal joint 20 will result in the configuration of the components shown in FIG. 3. In the deployed condition, screw shaft 22 minimally penetrates into and occupies tubular strut 24. In the retracted condition of FIG. 3, screw shaft is substantially contained within strut 24.

Strut 24 and screw shaft 22 thus expand and contract telescopically as a unit responsive to rotation of the latter by motor 12. Both strut 24 and screw shaft 22 are rigid, so that landing gear assembly 2 is successfully pushed into the deployed position (see FIG. 4) and drawn into the retracted position of FIG. 3. By contrast, drive shaft sections 16, 18 need not be rigid. They may instead comprise flexible drive cables (not shown) or any other device which can be drivingly connected to screw shaft 22.

Tubular strut 24 is rotatably connected to arms 30 which form a clevis. Arms 30 are solidly fixed to strut 6 of landing gear 2. The clevis of arms 30 accommodate pivot of strut 24 about the axis 32 of the pin of the clevis. Pivot at axis 32 accommodates relative motion of strut 6 and strut 24 as the drive moves strut 6 between the retracted position shown in FIG. 3 and the deployed position shown in FIG. 4. The drive of the novel operator is thus operably attached to its respective landing gear assembly 2.

Figure 5:
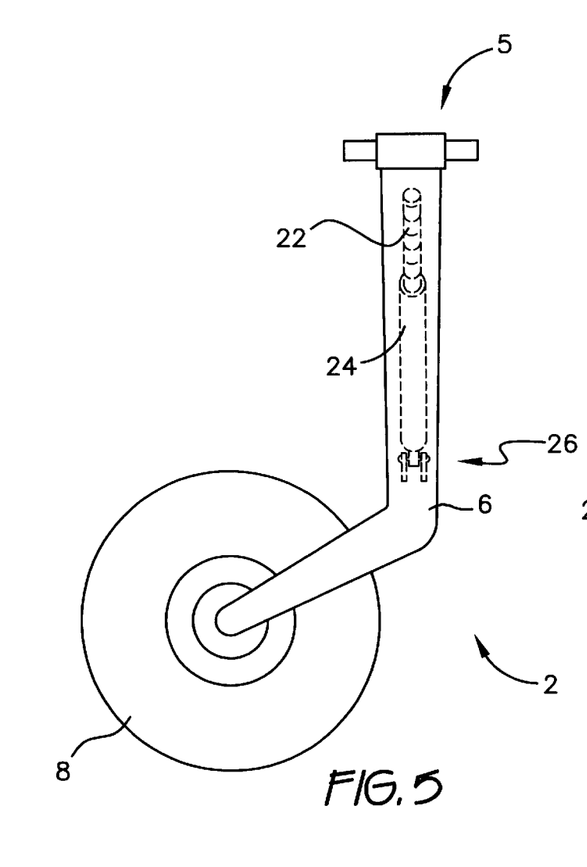
FIG. 5 is a side elevational view of landing gear seen at the right of FIG. 1, drawn to enlarged scale.

FIG. 5 shows that strut 6 is curved so that wheel 8 is offset forwardly of the main section of strut 6. This configuration avoids interference which could otherwise ensue between wheel 8 and strut 24 and screw shaft 22 as retraction of landing gear assembly 2 is achieved.

In the preferred embodiment shown in FIGS. 1–4, reduction gear assembly 14 has two opposed sides 36, 38. Drive shaft section 16 projects from side 36 and section 18 projects from side 38. This arrangement enables two drives to serve two landing gear assemblies 2 from a single part drive shaft. Internal components (not shown) of reduction gear assembly 14 may thus be minimized in number and complexity.

Figure 6:
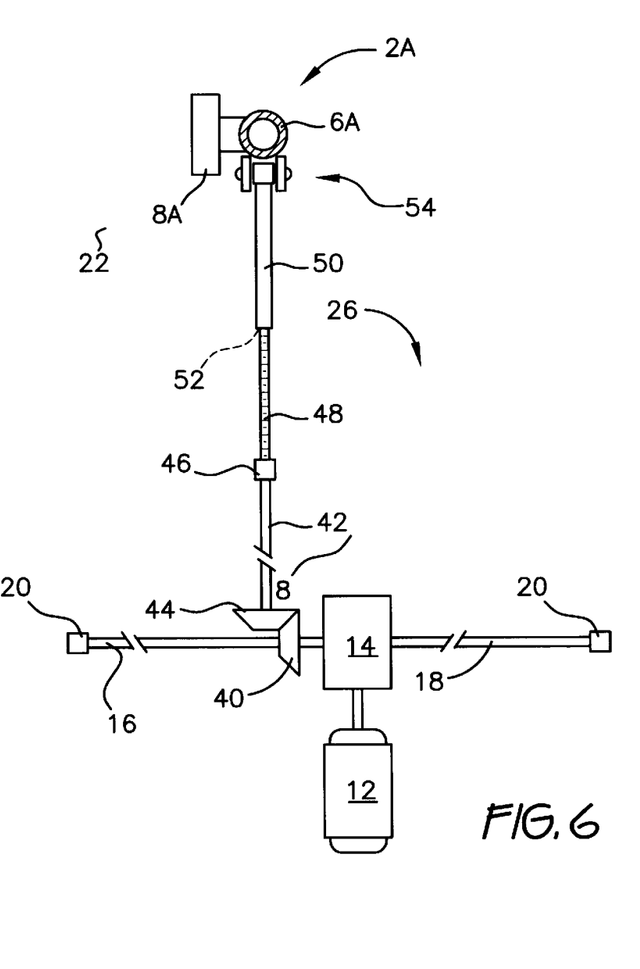
FIG. 6 is a diagrammatic, top plan detail view of the invention, showing connection of third landing gear.

Most aircraft have three landing gear or wheel assemblies, there being two principal weight bearing wheel assemblies such as landing gear 2, and either a nose wheel or tail wheel. FIG. 6 illustrates how a third landing gear assembly 2A may be operated simultaneously with landing gear assemblies 2. Landing gear assembly 2A comprises a strut 6A and wheel 8A. Shaft 16 has a power take off gear 40. A drive shaft 42 has a corresponding gear 44. Gears 40 and 44 turn the axis of rotation of drive shaft sections 16, 18 from transverse, with respect to the fuselage or longitudinal axis of aircraft 2, to longitudinal. Drive shaft 42 extends to a universal joint 46. A screw shaft 48 extends to a strut 50 which is closed by a threaded collar 52. Strut 50 is journaled at 54 to strut 6A of landing gear assembly 2A. The drive including drive shaft 42, universal joint 46, screw shaft 48, strut 50, and journalling arrangement 54 are essentially similar in function to the drives serving landing gear assemblies 2 of FIGS. 1–4. The only significant difference is that drive shaft 42 is drivably connected to take off gear 40, rather than being driven from reduction gear assembly 14. Of course, reduction gear assembly 14 could be modified to rotate drive shaft 42 if desired. Drive shaft 42 is disposed perpendicularly to drive shaft sections 16 and 18 in the embodiment depicted in FIG. 6. Of course, some deviation from the perpendicular could be provided to satisfy positioning of the third drive relative to its respective landing gear assembly 2A. Drive shaft 42 is disposed at a non-parallel angle with respect to drive shaft sections 16 and 18.

Figure 7:
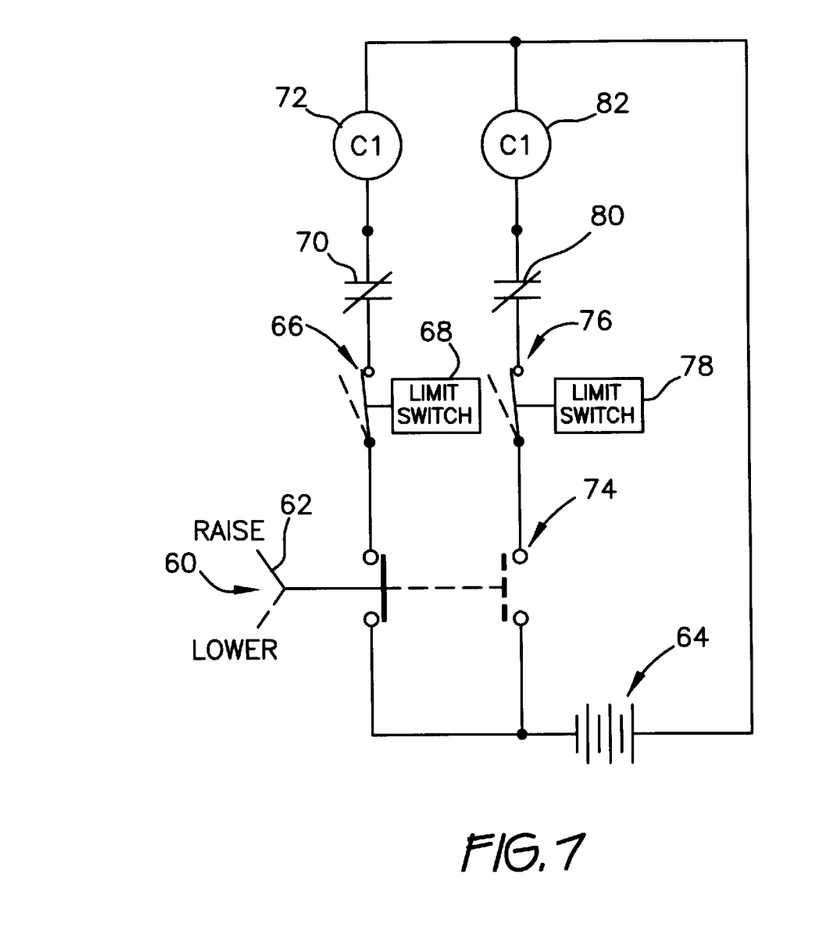
FIG. 7 is an electrical schematic showing a control circuit for controlling the motor.

FIG. 7 shows a control scheme for reversibly operating motor 12. A master two position switch 60 is preferably arranged such that its operating lever 62 points up when in a first position effecting raising of the landing gear and down when in a second position lowering the landing gear. In the first position, power from a battery 64 passes through contacts 66 of a first limit switch 68, through normally closed contacts 70 of a contactor C2 (not shown in its entirety), to one side of coil 72 of a contactor C1 (not shown in its entirety). The contactor C1 controlled by coil 72 is connected to motor 12 to operate motor 12 in a direction raising the landing gear, as will be described hereinafter with reference to FIG. 8.

When switch 60 is in the second position, this being illustrated in broken lines in FIG. 7, a circuit is closed extending from battery 64 through contacts 74 of switch 60, through contacts 76 of a second limit switch 78, through normally closed contacts 80 of contactor C1, to one side of coil 82 of contactor C1. The other side of coils 72, 82 are connected to the other side of battery 64.

Limit switch 68 is mounted at any suitable location on the aircraft such that contacts 66 open when wheel 8 reaches its final position in the stowed position. Similarly, limit switch 78 is mounted at any suitable location such that the circuit to coil 82 of contactor C2 is opened when wheel 8 is fully lowered in its deployed position. Normally closed contacts 70, 80 assure that contactors C1 or C2 cannot be energized simultaneously.

Figure 8:
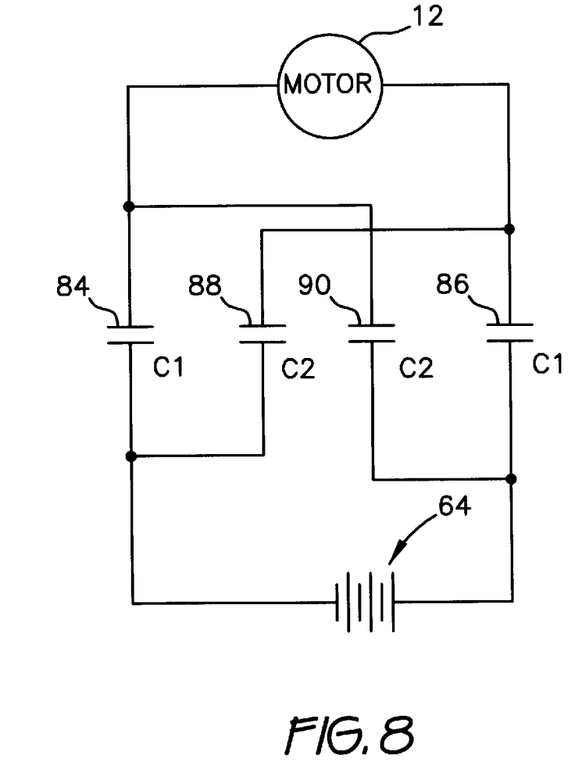
FIG. 8 is an electrical schematic showing a power circuit for operating the motor.

The power circuit is shown in FIG. 8. When contacts 84, 86 of contactor C1 are closed, power is conducted between battery 64 and motor 12 such that motor 12 runs in a direction raising the landing gear. When contacts 88, 90 of contactor C2 are closed, power is connected to motor 12 such that motor 12 operates in a direction opposite that effected by closure of contacts 84, 86.

It is to be understood that the present invention is not limited to the embodiments described above, but encompasses any and all embodiments within the scope of the following claims.

I claim:

1. An aircraft having retractable landing gear, comprising:
    a fuselage, a first wing, a second wing, and a structurally strong portion;
    landing gear comprising a first wheel assembly having a first weight supporting strut pivotally fixed to said structurally strong portion of said aircraft and a first wheel fixed to said first weight supporting strut, and second wheel assembly having a second weight supporting strut pivotally fixed to said structurally strong portion of the aircraft and a second wheel fixed to said second weight supporting strut; and
    an operator disposed to selectively lower said first wheel assembly laterally and in an arcuate path from one of said first and second wings into a deployed condition and said second wheel assembly laterally and in an arcuate path from the other of said first and second wings into a deployed condition and to laterally retract said first wheel assembly against and parallel to said one wing into a stowed condition and laterally to retract said second wheel assembly against and parallel to said other wing into a stowed condition, comprising:
    a motor disposed within said fuselage,
    a first drive shaft disposed transversely within said fuselage, drivingly connected to said motor, and disposed to provide rotating motion, said first drive shaft having a proximal end and a distal end, a first rigid screw shaft and a first universal joint longitudinally flexibly securing said first screw shaft to said distal end of said first drive shaft, a first elongated, rigid member having a proximal end and a distal end, said first elongated, rigid member disposed to engage said first weight supporting strut, said proximal end of said first rigid member having a first threaded collar disposed to receive said first screw shaft, said first rigid member and said first screw shaft disposed to expand and contract telescopically and parallel to one another and to push said first weight supporting strut into said deployed condition and to pull said first weight supporting strut into said stowed condition when said motor drives said first screw shaft, and
    a second drive shaft disposed transversely within said fuselage, drivingly connected to said motor, and disposed to provide rotating motion, said second drive shaft having a proximal end and a distal end, a second rigid screw shaft and a second universal joint flexibly securing said second screw shaft to said distal end of said second drive shaft, a second elongated, rigid member having a proximal end and a distal end, said second elongated, rigid member disposed to engage said second weight supporting strut, said proximal end of said second rigid member having a second threaded collar disposed to receive said second screw shaft, said second rigid member and said second screw shaft disposed to expand and contract telescopically and parallel to one another and to push said second weight supporting strut into said deployed condition and to pull said second weight supporting strut into said stowed condition when said motor drives said second screw shaft.

2. The landing gear according to claim 1, further comprising a reduction gear assembly supported within said fuselage and disposed to connect said first and second drive shafts to said motor.

3. The landing gear according to claim 2, said reduction gear assembly having two opposed sides, said first drive shaft projecting from said reduction gear assembly from one of said two opposed sides and said second drive shaft projecting from said reduction gear assembly from the other one of said two opposed sides.

4. The landing gear according to claim 3, said first drive shaft having
    a take off gear, a third drive shaft having a proximal end drivably connected to said take off gear and a distal end, a third rigid screw shaft and a third universal joint flexibly securing said third screw shaft to said distal end of said third drive shaft;

a third elongated, rigid member having a proximal end and a distal end, said proximal end having a third threaded collar disposed to receive said third screw shaft, said third rigid member and said third screw shaft disposed to expand and contract telescopically when said third screw shaft rotates; and third means for pivotally engaging third landing gear such that the third landing gear is selectively pulled into a retracted condition and pushed into a deployed condition when said third screw shaft is rotated.

5. The landing gear according to claim 4, said third drive shaft being disposed at an angle to said first drive shaft and said second drive shaft.

6. The operator according to claim 1, said first elongated rigid member being tubular, and said screw shaft being arranged to enter said first elongated rigid member by threading into said first threaded collar and into the interior of said first elongated rigid member.

* * * * *